US005436059A

United States Patent [19]
Kano

[11] Patent Number: 5,436,059
[45] Date of Patent: Jul. 25, 1995

[54] SELF-ADHESIVE INFORMATIVE LABEL FOR A RECORDING MEDIUM-ACCOMMODATING CASSETTES AND LABELLING METHOD USING THE SAME

[75] Inventor: Kenichi Kano, Miyagi, Japan

[73] Assignee: Sony Corporation, Japan

[21] Appl. No.: 125,688

[22] Filed: Sep. 24, 1993

[30] Foreign Application Priority Data

Sep. 28, 1992 [JP] Japan .................................. 4-281145

[51] Int. Cl.⁶ .................................. B32B 3/00
[52] U.S. Cl. .................................. 428/195; 428/42; 428/174; 428/187; 428/206; 206/232; 206/459.5
[58] Field of Search .................. 428/307.3, 307.7, 195, 428/206, 914, 207, 42, 174, 187; 206/232, 459, 459.5

[56] References Cited

U.S. PATENT DOCUMENTS

| 4,183,300 | 1/1980 | Jamshidi | 101/426 |
|---|---|---|---|
| 4,271,223 | 6/1981 | Lambert et al. | 428/207 |
| 4,801,487 | 1/1989 | Kalus et al. | 428/206 |
| 5,103,978 | 4/1992 | Secor | 206/387 |
| 5,195,265 | 3/1993 | Klingenberg | 40/638 |
| 5,308,693 | 5/1994 | Ryle et al. | 428/307.3 |

FOREIGN PATENT DOCUMENTS

| 0297668 | 1/1989 | European Pat. Off. . |
| 8904280 | 7/1989 | Germany . |
| 3907263 | 9/1990 | Germany . |
| 2203278 | 10/1988 | United Kingdom . |
| 2118135 | 10/1991 | United Kingdom . |
| 9000788 | 1/1990 | WIPO . |
| 9116025 | 10/1991 | WIPO . |

OTHER PUBLICATIONS

Patent Abstracts of Japan, vol. 7, No. 265, Pub. No. JP8145490, Pub. Date Aug. 30, 1983, Inventor: Sasaki Makoto.
European Search Report, No. EP 93 40 2363, dated Sep. 20, 1994.

*Primary Examiner*—Patrick J. Ryan
*Assistant Examiner*—William A. Krynski
*Attorney, Agent, or Firm*—Ronald P. Kananen

[57] ABSTRACT

A label which is attached to recording medium cassettes such as tape cassettes and disk cassettes comprises a substrate having a self-adhesive layer on one side thereof and an ink receiving layer on the other side of the substrate. After attachment of the label to at least one surface portion of the cassette, the label is printed with a desired pattern and them formed with a transparent top coat layer on the print surface.

9 Claims, 8 Drawing Sheets

SELF-ADHESIVE INFORMATIVE LABEL FOR A RECORDING MEDIUM-ACCOMMODATING CASSETTES AND LABELLING METHOD USING THE SAME

BACKGROUND OF THE INVENTION

1. Field of The Invention

This invention relates to the labelling art and more particularly, to a novel type of self-adhesive label which is adapted for use in recording medium-accommodating cassettes. The invention also relates to a method for labelling cassettes for recording mediums with desired full color images on a label of the cassette.

2. Field of The Related Art

As is known in the art, cassettes for accommodating recording mediums such as recording tapes, mini-disks and the like have been heretofore formed of colored resin materials with colors other than a white color, e.g. a black color. Where a full color print is made on such a cassette as mentioned above, it is necessary to form an underlying print according to so-called "white solid printing" in order to obtain desired color tone and shade. It will be noted that the term "white solid printing" is intended to mean solid printing of a white filler over the entire surface of a substrate. However, the underlying print made according to the white solid printing is not good with respect to working properties, resulting in the rise of costs and poor yield. If the white solid print and a full color print of a desired pattern are carried out after assembling of cassettes where a failure in printing takes place, it will be difficult to re-construct the once printed cassette into a fresh one.

Moreover, if an underlying coating or print is subjected to a so-called soft cassette or soft disk where information has been already recorded, followed by further full color printing, additional steps are undesirably required, thus being not efficient from the standpoint of the fabrication of the cassette.

In addition, the requirements for the underlying print formed according to the white solid printing and also for a direct full color direct print will make little degree of freedom for original designing on the part of intermediate users. This means that only the designs provided from makers are drawn, and little room is left on intermediate users making additional designs for recording medium cassettes which are used for presentation or in various events.

SUMMARY OF THE INVENTION

It is accordingly an object of the present invention to provide a self-adhesive informative label which is adapted for use in recording medium-accommodating cassettes and a cassette having such a label thereon.

It is another object of the invention to provide a self-adhesive label whereby a so-called white solid print which has been hitherto made on cassettes for accommodating recording medium is not necessary and which enables one to print the label by a variety of printing systems.

It is a further object of the invention to provide a self-adhesive label which is removable from the cassette and a fresh label may be attached to the removed cassette to renew a print design.

It is a still further object of the invention to provide recording medium-accommodating cassettes each having a self-adhesive label thereon whereby a diversity of final cassette articles each in a small lot can be readily made, thus leading to easy provision of the cassettes with intended designs for use in various events and for the purpose of presentation.

The above objects can be achieved, according to one embodiment of the invention, by a cassette for accommodating a recording medium therein which has at least one surface portion on which a self-adhesive label is attached, the label comprising a substrate, a self-adhesive layer formed on one side of the substrate, an ink-receiving layer formed on the other side of the substrate and made of a material capable of absorbing an ink, a print layer formed on the ink-receiving layer and made of a color ink, and a transparent top coat layer formed on the print layer to protect a surface of the print.

According to another embodiment of the invention, there is also provided a method for labelling a cassette accommodating a recording medium therein which comprises the steps of attaching a label on at least one surface portion of the cassette, subjecting the attached label to printing in a desired pattern, and forming a transparent top coat layer on the printed label to protect the printed label.

According to the invention, the underlying print is not effected directly on the cassette, but on the label. Thus, the workability for the printing is very good. If there are provided labels having different types of ink-receiving layers including those which have good affinity for aqueous inks and those which have good affinity for oily inks, an appropriate type of ink can be selected depending on the type of design. As a matter of course, a non-contact printing system, such as an ink jet printing system, may be used. Thus, after assembling of the cassettes, printing is suitably performed for the production of a diversity of cassette articles each in a small lot. The use of the label according to the invention is adapted for use in cassettes of so-called soft tapes and soft disks.

DETAILED DESCRIPTION AND EMBODIMENTS OF THE INVENTION

Figure 1:
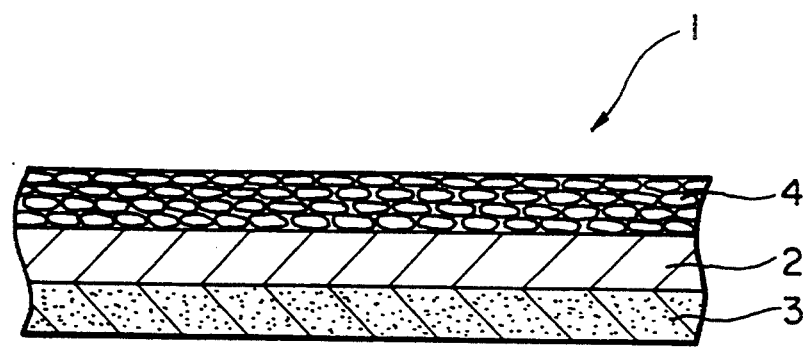
FIG. 1 is an enlarged, sectional view of an essential part of a label for recording medium cassettes according to one embodiment of the invention.

Reference is now made to the accompanying drawings and, particularly, to FIGS. 1 to 6. In the figures, like reference numerals indicate like members or parts, respectively.

In FIG. 1, there is schematically shown a white label 1. The white label 1 includes a substrate 2 which is made, for example, of wood-free paper or films of resins such as polyethylene terephthalate. In order to improve adhesion to a layer formed on opposite sides of the substrate, it is preferred that the the substrate is subjected to embossing such as by corona discharge treatment or plasma treatment so that the surface is roughened.

A self-adhesive layer 3 is formed on one side of the substrate 2 and may be made of any material ordinarily used for this purpose. It will be noted that the adhesive layer 3 may not be formed by application of a self-adhesive directly on the substrate 2, but a double-coated adhesive tape may be attached to the one side of the substrate 2.

An ink-receiving layer 4 is formed on the other side of the substrate 2. The layer 4 is made of a filler which has good ink absorptivity. Such a filler includes, for example, silica, alumina, calcium carbonate or the like and is dispersed in binder resins ordinarily used for this purpose. The white label 1 have the layers 2, 3 and 4 whose thickness ranges from 3 to 100 $\mu m$ for the respective layers.

It will be noted here that the ink-receiving layer should preferably be white in color.

Figure 6:
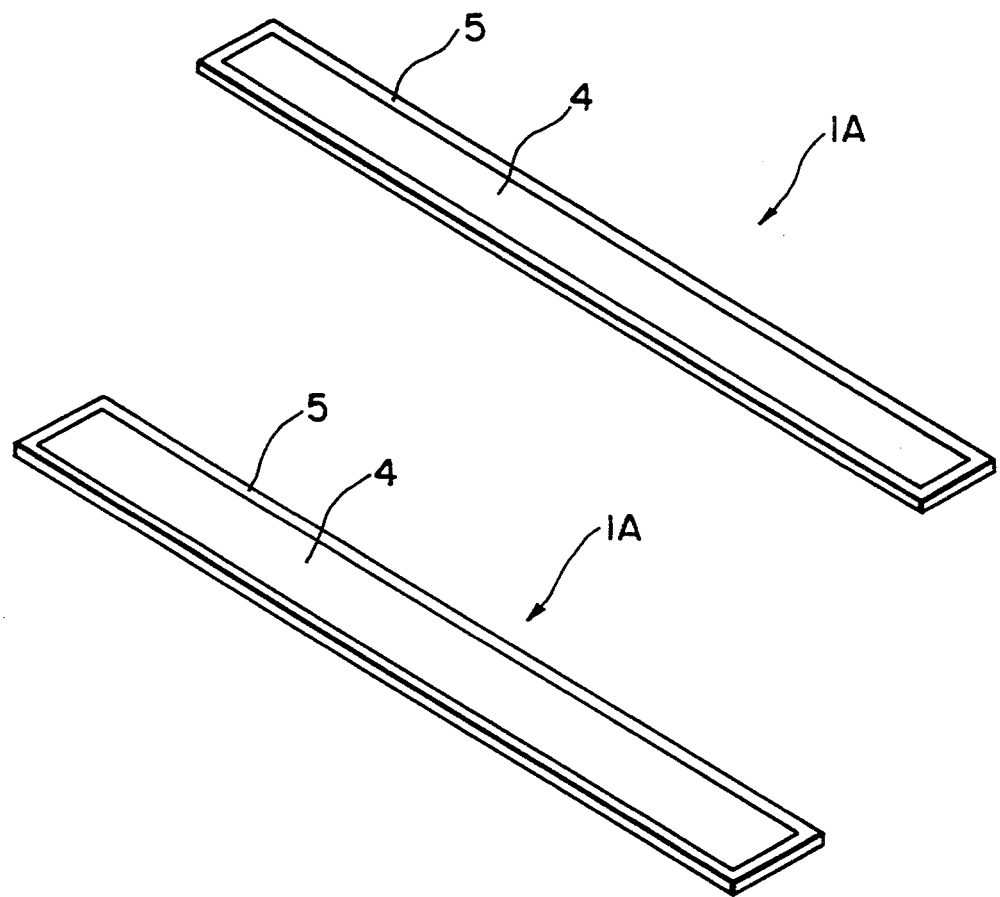
FIG. 6 is a view showing a label according to further embodiments of the invention.

The label may be modified as shown in FIG. 6. More particularly, a white label 1A of FIG. 6 has, aside from those layers of FIG. 1, a marginal print layer 5 formed along the peripheral margin of the layer 4 with a width ranging from 0.5 mm to 5.0 mm. The print layer 4 may be made of an oil or water-soluble dye ink. Preferably, the marginal print layer 5 is made of a dark color ink other than inks of the three primary colors, or a gold or silver color ink.

When the white label 1A is printed such as by ink jet printing in a condition, where the label is attached to a cassette, to a full extent of the margin of the label 1A, a dye ink is scattered therearound and deposited on a resin surface of the cassette other than the white label. The deposited ink is not immediately dried, thereby contaminating the cassette.

When the marginal print layer 5 is formed as with the white label 1A, it is not necessary to print the white label to an extent of the marginal portion of the label. Thus, the contamination of the cassette owing to the scattering of the ink at the time of printing can be prevented.

The white label 1 or 1A is attached in position of a cassette and subjected to printing.

Figure 2:
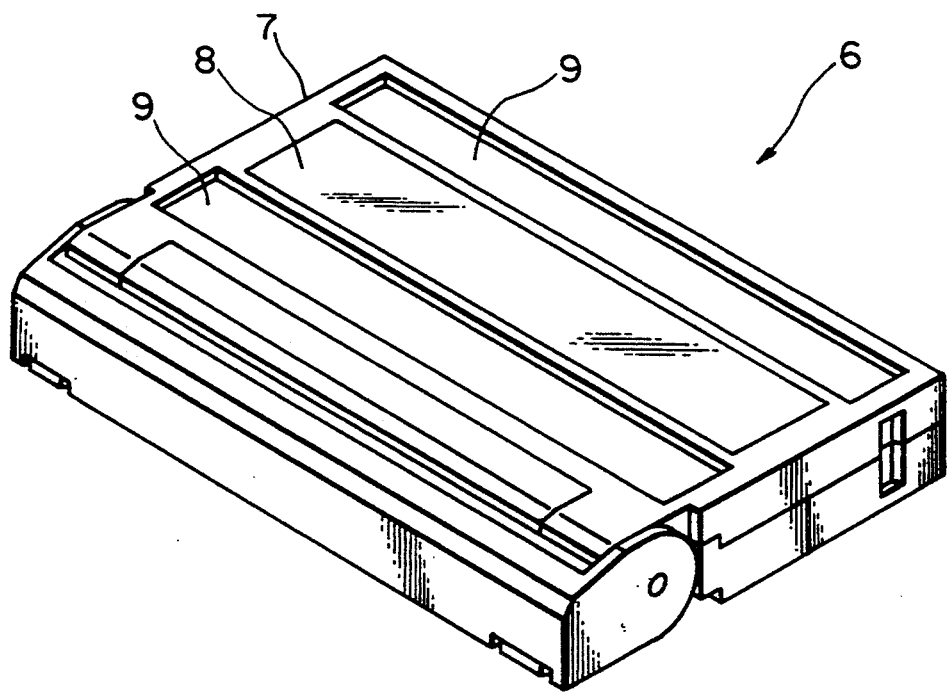
FIG. 2 is a perspective view of a cassette casing of a recording tape on which a label of the invention is to be attached.

FIG. 2 shows a typical example of a 8 m tape cassette 6 which includes a case 7 having an elongated transparent window portion 8 substantially at the upper cent of the case 7. Elongated label-attaching surface areas or portions 9, 9 are provided at opposite sides of the window portion 8 as shown. The areas or portions 9, 9 are formed as recessed. The recessed portions 9, 9 have, respectively, a depth which is larger than the thickness of the white label 1 or 1A. For instance, the depth is at least two times the thickness of the white label 1 or 1A. Each recessed portion is designed to have a size substantially equal to or larger by 0 to 3.0 mm than the size of the white label 1 or 1A at each side thereof.

Figure 3:
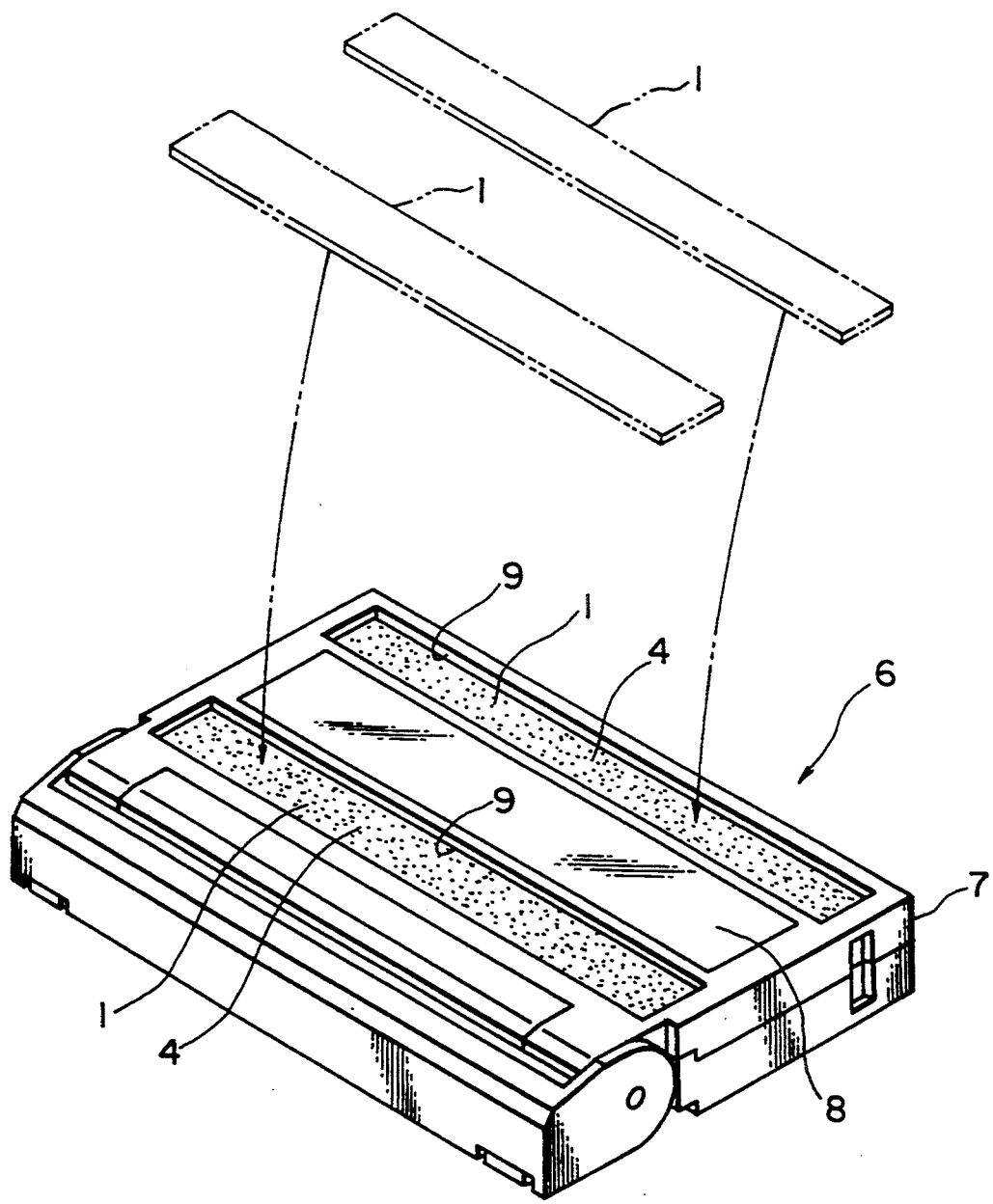
FIG. 3 is a perspective view of a cassette casing on which labels are attached.
Figure 4:
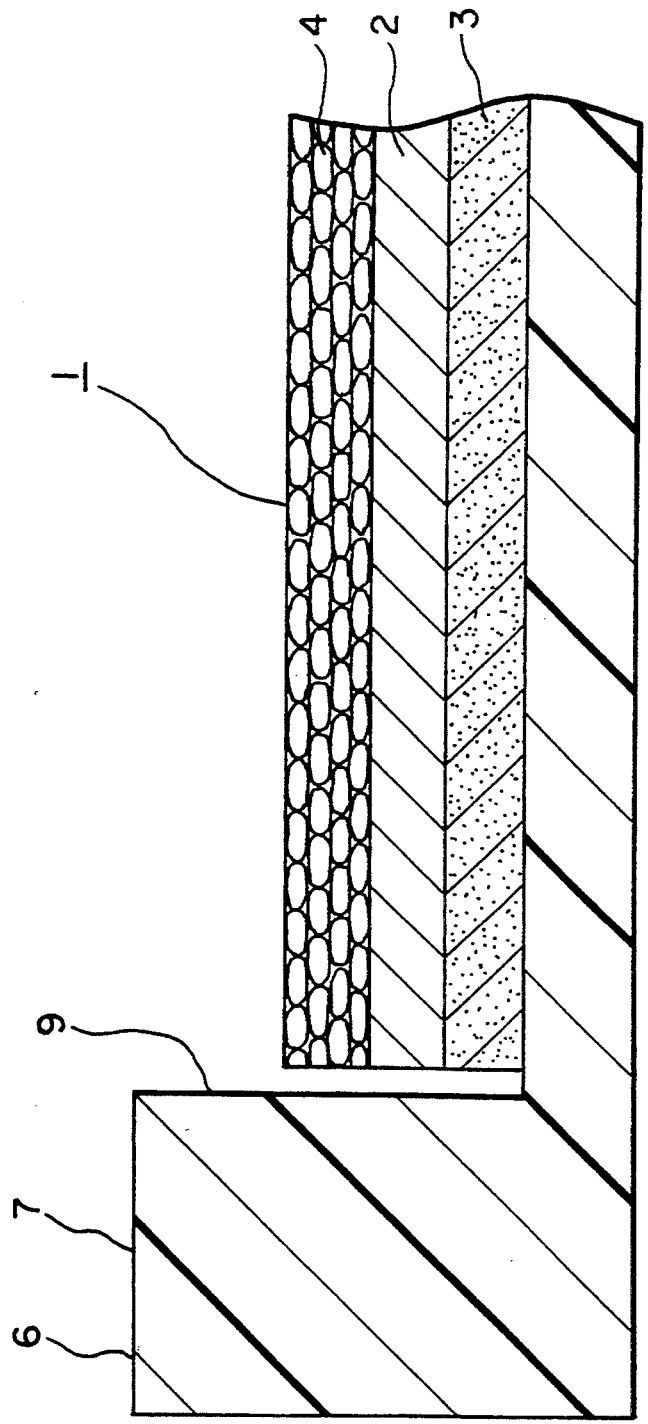
FIG. 4 is an enlarged, sectional view of the label attached to the cassette casing of FIG. 3.

FIG. 3 shows the cassette case to which the white label 1 is attached at each surface recessed portion 9 of the cassette 7. The attachment of the label 1 is more particularly depicted in FIG. 4.

Figure 5:
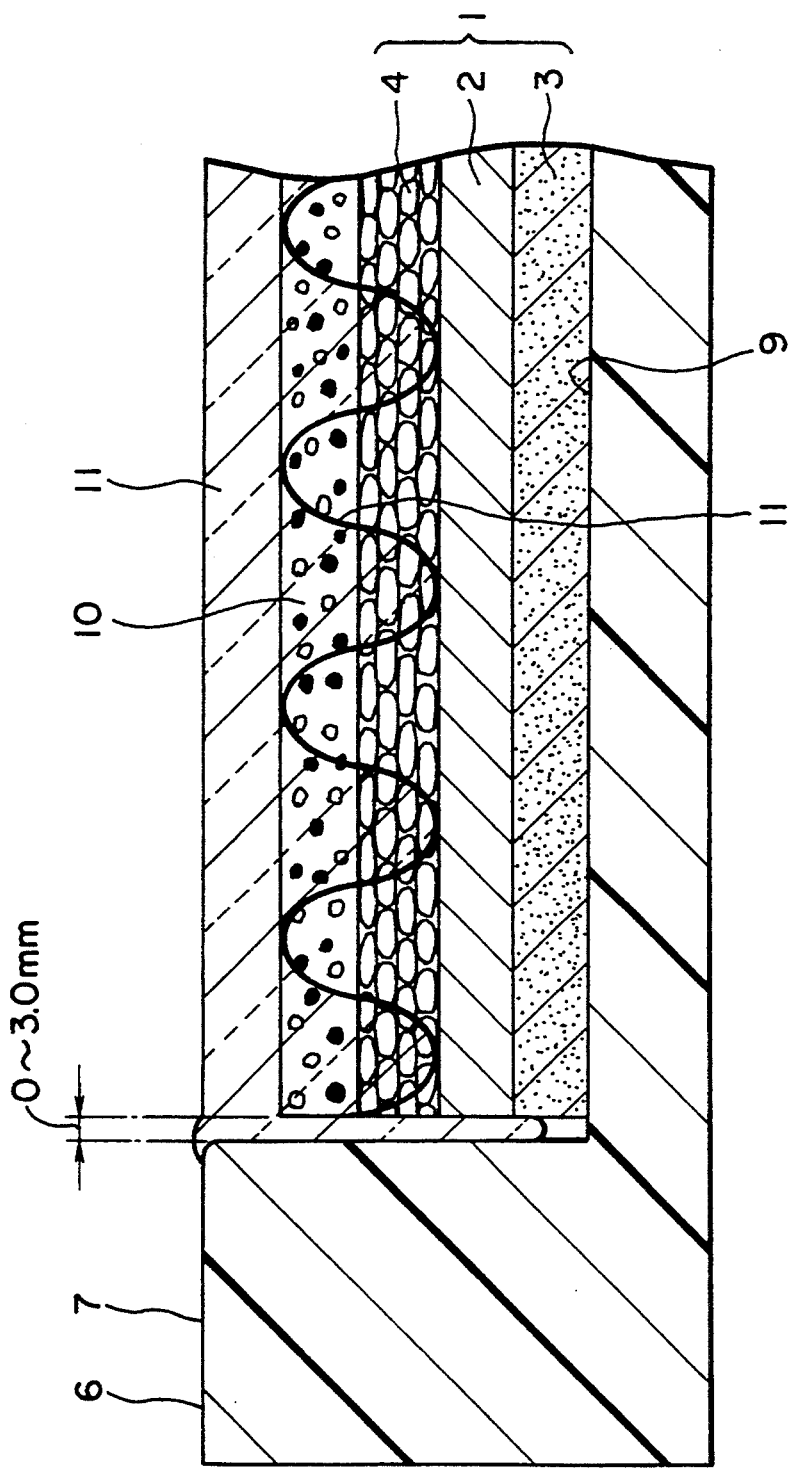
FIG. 5 is an enlarged sectional view of the label attached to the cassette casing of FIG. 3 wherein the label is printed and then formed with a transparent top coat layer.

In this state, the white labels 1, 1 or 1A, 1A on the cassette 7 is printed with a desired design by means of an appropriate printing machine, thereby forming a print layer 10 on the ink-receiving layer 4 of each label as shown in FIG. 5. More particularly, a desired design using, for example, three primary color inks and a black ink is printed, in full colors, on the ink receiving layer 4 of the white labels 1, 1 or 1A, 1A. Thus, the print layer 10 is formed as shown in FIG. 5. Thereafter, a transparent top coat layer 11 is formed on the print layer 10.

The transparent top coat layer 11 penetrates through the print layer 10 and the ink receiving layer 4 to the substrate 2 as schematically shown as a wave 11 in FIG. 5. Thus, the top coat layer 11 serves to protect the print layer 10 and to firmly fix it to the substrate 2. As a matter of course, the penetration of the coating of the top coat layer 11 is stopped at the substrate 2 and does not arrive at the self-adhesive layer 3, thereby preventing the self-adhesiveness of the layer 3 from lowering.

The transparent top coat layer 11 should preferably be formed to overcoat the white labels 1, 1 or 1A, 1A within a range of from 0 to 3 mm from the white label margin. By this, the transparent top coat layer 11 is provided in a gap between the side edge of each white label 1 or 1A and the side walls of the recess of the cassette 6, so that the print layer 10 and the white labels 1, 1 or 1A, 1A are prevented from being peeled off.

Figure 7:
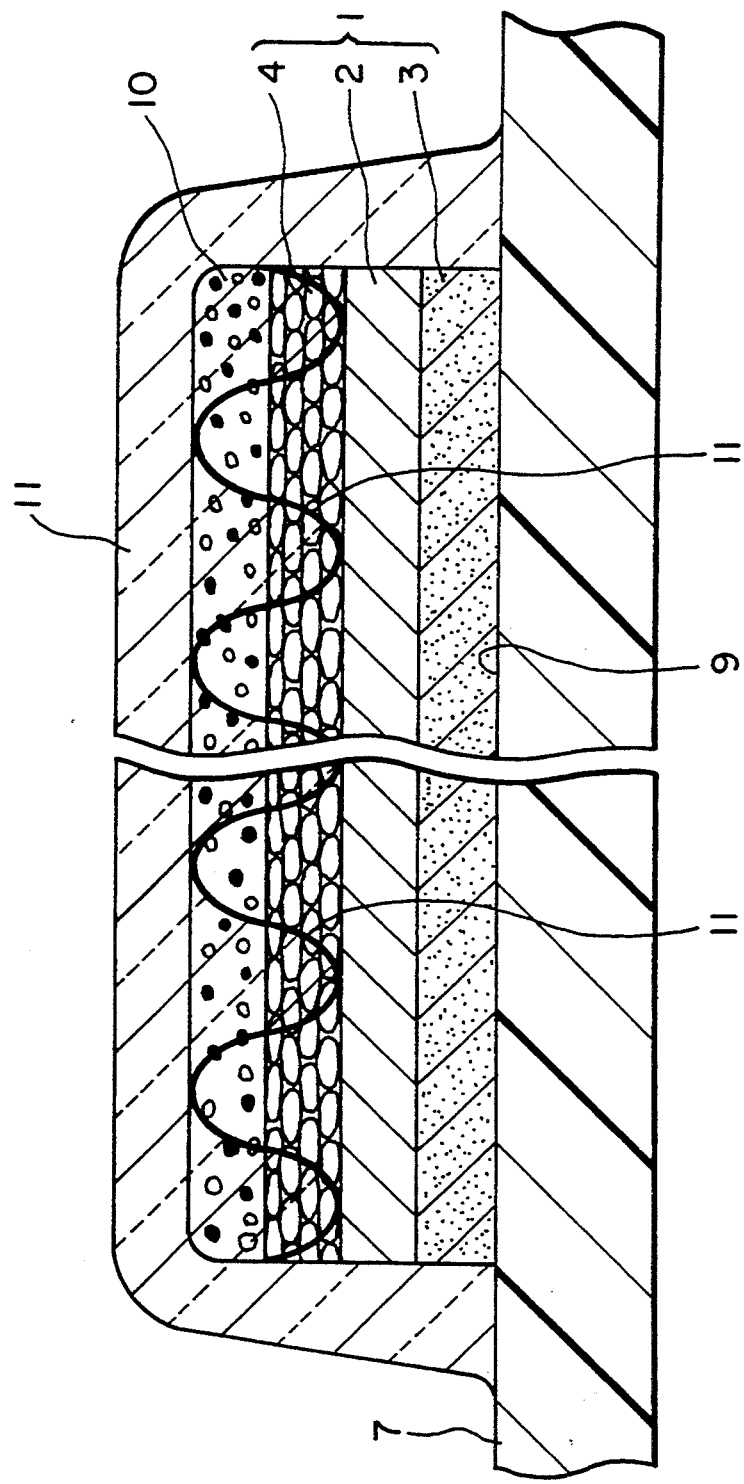
FIG. 7 is an enlarged, sectional view showing a surface portion of a cassette casing, on which a label is attached, according to another embodiment of the invention.

In the above embodiment, the surface portions on which the labels are attached have been illustrated as recessed. In this connection, the surface portions may be flat as shown in FIG. 7. That is, the white labels 1,1 or 1A, 1A may be attached to the flat surface portions. If the white labels 1,1 or 1A, 1A are, respectively, attached to the flat surface portions of the cassette 6 under which the transparent top coat layer is overcoated the white labels 1,1 or 1A, 1A each having the print layer 10 as is particularly shown in FIG. 7, the effect of protecting the print layer 10 and the labels 1, 1 or 1A, 1A with the transparent top coat layers becomes more significant.

The white labels 1,1 or 1A, 1A may be printed by various printing systems such as a copying system using a toner, offset printing, ink jet printing, DAE and the like systems. Thus, the degree of freedom with respect to the printing system can be increased.

Especially, when a printing system using a non-contact printing head, e.g. an ink jet printing system, is adopted, printing on an irregular surface becomes easy. In addition, when the printing is controlled in association with an image processor, fabrication of a diversity of cassette articles each in a small lot will become possible.

Figure 8:
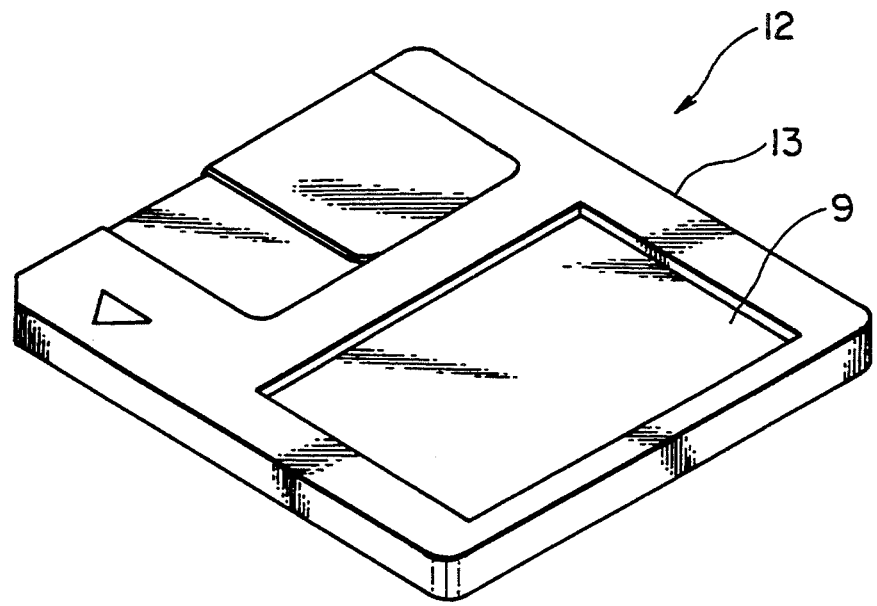
FIG. 8 is a perspective view of a disk cassette having a surface portion on which a label is to be attached.
Figure 9:
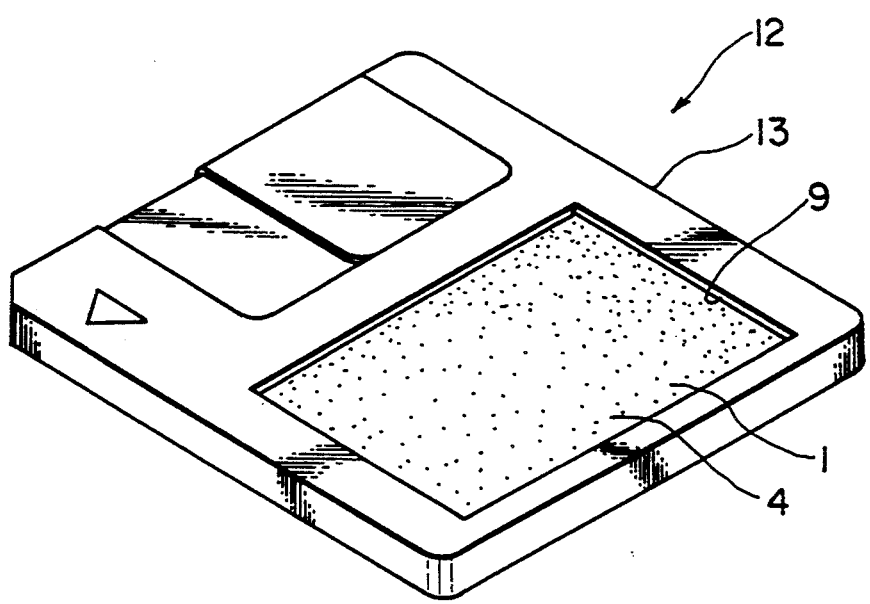
FIG. 9 is a view similar to FIG. 8 but the label is attached to the surface portion.
Figure 10:
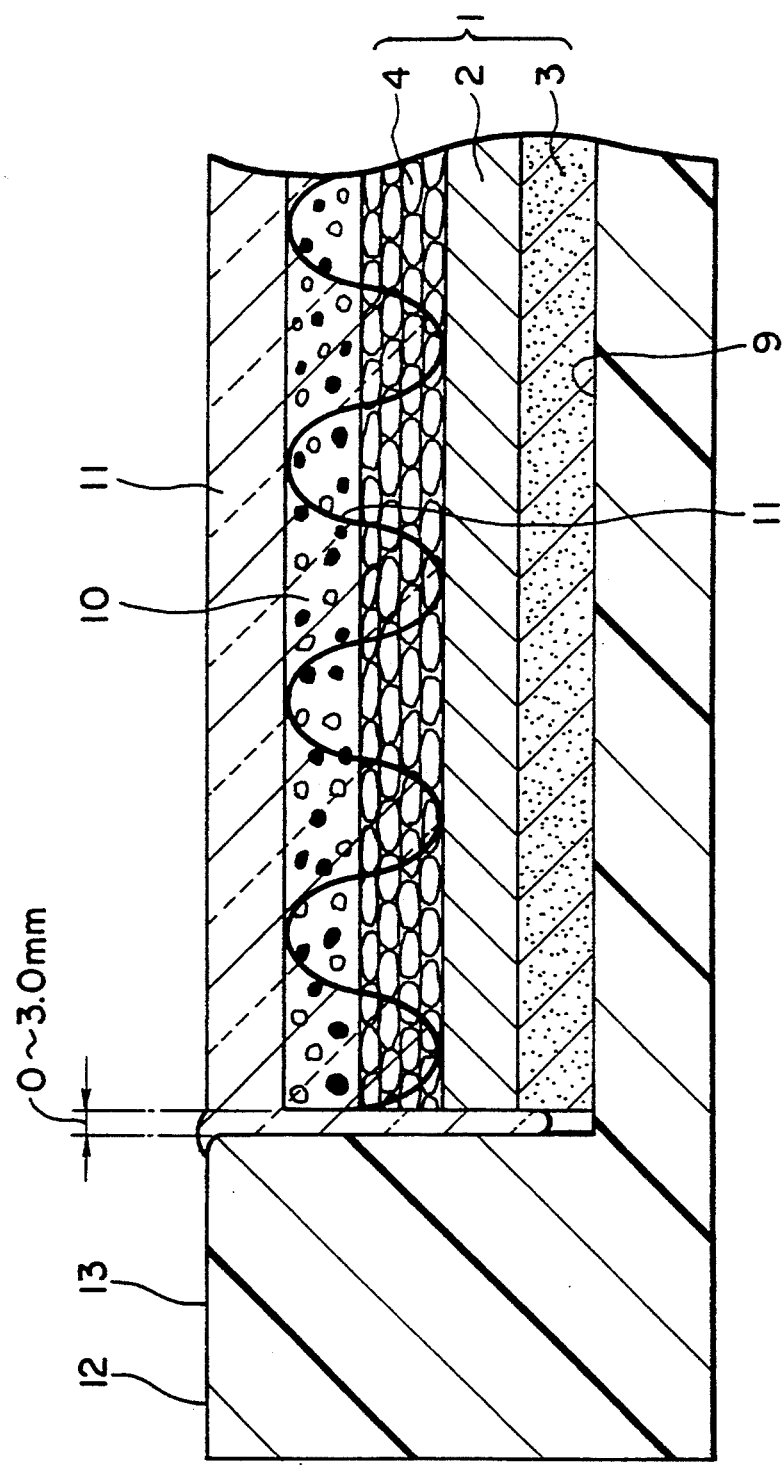
FIG. 10 is an enlarged sectional view of the label of FIG. 9 which is subjected to printing and then formed with a transparent top coat layer.

In the above embodiment, although the white labels 1,1 or 1A, 1A have been illustrated as attached to the tape cassette, they may be be applied to a case 13 of a disk cassette 12 such as a mini disk, in a manner as is particularly shown in FIGS. 8 to 10.

It will be noted here that although the two white labels have been illustrated as attached to the two surface portions of a cassette, only one label or three or more labels may be attached to the cassette in a similar manner.

The present invention is more particularly described by way of example wherein an aqueous ink is used for printing.

Example

A wood-free paper sheet or a resin film such as polyethylene terephthalate, polypropylene, polyvinyl chloride or oriented polypropylene is provided as a substrate 1.

In order to improve adhesion to a self-adhesive layer 3 and an ink-receiving layer 4, the substrate may be embossed or roughened on the surfaces thereof by subjecting to corona discharge treatment or plasma treatment.

The self-adhesive layer 3 may be one which is ordinarily used for recording medium-accommodating cassettes, or may be a double-sided adhesive tape.

The ink-receiving layer 4 is an ink-absorbing filler layer and is formed using the following composition.

| | |
|---|---|
| Silica, alumina or calcium carbonate filler | 100 parts by weight |
| Gelatin or starch binder | 30 parts by weight |
| Water-soluble synthetic resin binder | 5 parts by weight |
| Water | 150 to 300 parts by weight |

An aqueous solution of the above formulation is applied onto a surface portion of the substrate 2 and dried to form the layer 4.

The above formulation has to be changed depending on a nozzle size of a printing head when ink jet printing is effected.

Inks used to provide a print layer 10 have the following formulation for each primary color

| | |
|---|---|
| Dye | 2 to 3 parts by weight |
| Diethyl alcohol | 30 parts by weight |
| Water | 50 to 70 parts by weight |

The above ingredients are mixed to obtain an aqueous printing ink for each color. These inks are, respectively, printed to obtain a full color image.

The transparent top coat layer 11 is formed using a solution which comprises a main ingredient of a water-soluble polymer or organic solvent-soluble resin such as an alkyd resin, a polyurethane, a polyamide, a phenolic resin, polyvinyl formal, polymethyl methacrylate, polyvinyl acetate or polyvinyl butyral in a mixed solvent comprising, for example, 70 parts by weight of water and 10 to 20 parts by weight of an organic solvent. The solution is applied onto the print layer 10 and dried to form the top coat layer 11.

As will be apparent from the above, the label set out above is one which is attached to cassettes for accommodating recording medium such as tape cassettes, disk cassettes and the like. The label is characterized by comprising the self-adhesive layer on one side of the paper or resin film substrate and the ink-receiving layer capable of absorbing printing inks on the other side of the substrate.

The recording medium-accommodating cassette of the invention is characterized by attachment of at least one label on the cassette.

It is not necessary to print an underlying layer directly on the cassette as has been hitherto performed in the art of recording medium cassettes, but on the label. Thus, workability is significantly improved with respect to the printing work.

If different types of ink-receiving layers having the capability of receiving an aqueous ink and the capability of receiving an oily ink, respectively, are provided, an appropriate ink can be selected for printing depending on the design. As a matter of course, the label can be printed using non-contact printing systems such as an ink jet printing system. This makes it possible to print the label after attachment of assembled cassettes, ensuring a small lot of cassettes to be printed in a desired design. This is appropriate for printing so-called soft tapes or soft disks.

Accordingly, tape cassettes for presentation or event services with a desired design can be readily fabricated. In addition, if the label is removed from a cassette and a fresh print-bearing label is attached to the cassette, the cassette itself may be renewed with a different print design, thus increasing the degree of freedom of the design.

It will be noted that various modifications and variations may be made to the invention within the scope of the invention and the example set out hereinbefore is illustrated only.

What is claimed is:

1. A cassette for accommodating a recording medium therein which has at least one surface portion on which a self-adhesive label is attached, said label comprising:
   a substrate having first and second sides,
   a self-adhesive layer having a thickness ranging from 3 to 100 μm formed on the first side of said substrate,
   an ink-receiving layer having a thickness ranging from 3 to 100 μm formed on the second side of said substrate and made of a material capable of absorbing an ink,
   a print layer having a thickness ranging from 3 to 100 μm formed on said ink-receiving layer in a desired pattern, and
   a transparent top coat layer formed on said print layer, said top coat layer penetrating through said print layer and said ink receiving layer to protect said print layer and to fix said print layer to said substrate.

2. A cassette according to claim 1, wherein said at least one surface portion comprises a recess with a surface area which is larger than a surface area of said label.

3. A cassette according to claim 2, wherein said transparent top coat layer is provided in a gap between said label and side walls of the recess.

4. A cassette according to claim 1, wherein said ink-receiving layer is formed with printing along a marginal edge thereof.

5. A cassette according to claim 1, wherein said substrate is embossed.

6. A cassette according to claim 1, wherein said print layer is formed using color inks to provide a color pattern.

7. A cassette according to claim 1, wherein said at least one of said first and second sides of said substrate is roughened using corona discharge treatment.

8. A cassette according to claim 7, wherein said at least one of said first and second sides of said substrate is roughened using plasma treatment.

9. A cassette according to claim 1, wherein said top coat penetrates through said print layer and said ink receiving layer to a level whereat it does not contact said self-adhesive layer on the first side of said substrate.

* * * * *